United States Patent [19]

Takahashi et al.

[11] Patent Number: 4,610,520
[45] Date of Patent: Sep. 9, 1986

[54] FILM UNIT WITHDRAWING APPARATUS

[75] Inventors: Tomoyuki Takahashi; Masashi Kato; Hisashi Kikuchi, all of Kanagawa, Japan

[73] Assignee: Fuji Photo Film Co., Ltd., Kanagawa, Japan

[21] Appl. No.: 713,631

[22] Filed: Mar. 19, 1985

[30] Foreign Application Priority Data

Mar. 26, 1984 [JP] Japan .................... 59-56287

[51] Int. Cl.⁴ ............................. G03B 17/52
[52] U.S. Cl. ........................ 354/86; 354/79
[58] Field of Search ................ 354/75, 79, 86

[56] References Cited

U.S. PATENT DOCUMENTS 4,201,457 5/1980 Erlichman .................... 354/86
4,330,185 5/1982 Huber ........................ 354/86

Primary Examiner—Michael L. Gellner
Attorney, Agent, or Firm—Young & Thompson

[57] ABSTRACT

A film unit withdrawing apparatus withdraws an exposed film unit from the film pack while permitting it to pass through a pair of pressure rollers. The peel apart type film unit to be used for this apparatus is attached with a tab. This film unit withdrawing apparatus is such that after a photograph is taken, the aforementioned tab is held between and withdrawn by a tab transfer roller and a nip roller. Following the withdrawal of the tab, the pull end of the film unit is ejected by passing between the pressure rollers. Simultaneously, the tab is torn off the film unit. Subsequently, the pull end of the film unit is held between a film unit transfer roller and a nip roller, and the film unit is automatically withdrawn by passing between the pressure rollers.

9 Claims, 13 Drawing Figures

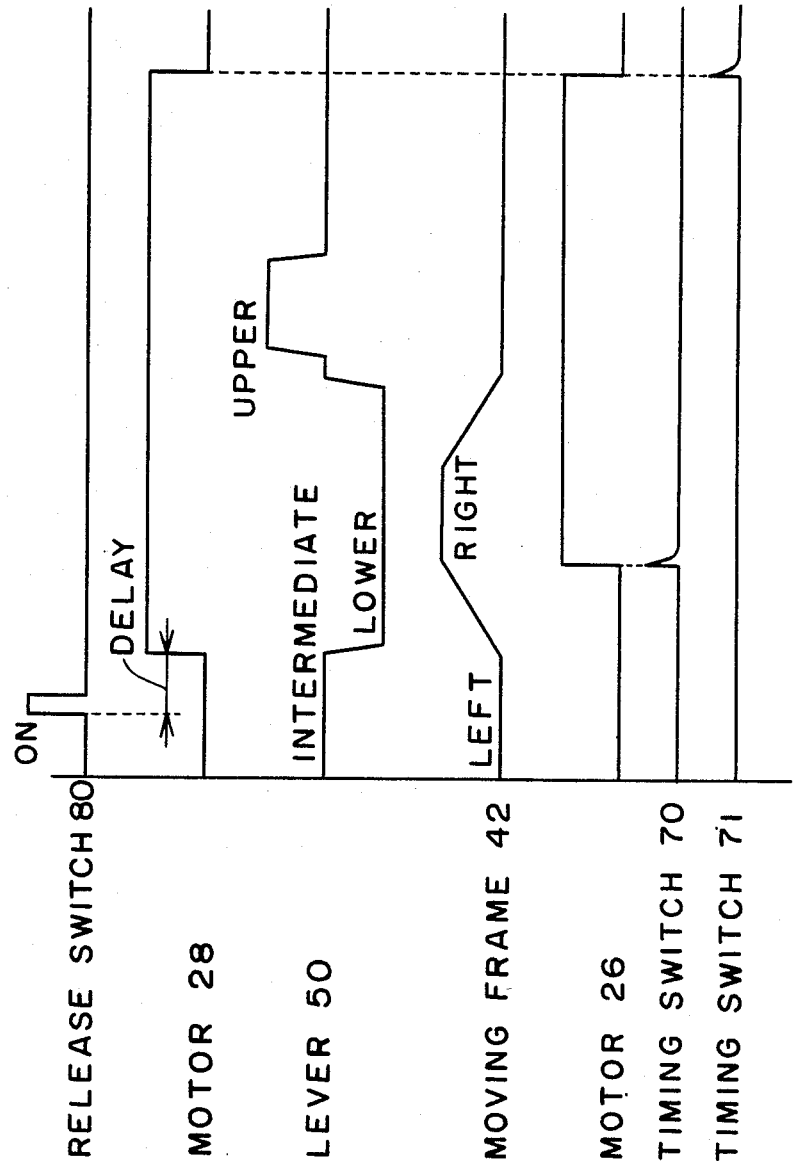

FILM UNIT WITHDRAWING APPARATUS

BACKGROUND OF THE INVENTION

This invention relates to a film unit withdrawing apparatus, and more particularly to an apparatus which automatically withdraws an exposed peel apart type instant film unit while permitting it to pass through a processing liquid spreading apparatus.

As is well known, a peel apart type instant film unit comprises a negative sheet, a positive sheet separately contained in a film pack, web means adapted to interconnect said two sheets in superposed relation when they are withdrawn from the film pack, and a pod holding processing liquid therein. In addition, a pull tab to be pulled out from the film pack prior to the withdrawal of the film unit is attached to a part of said web means. When a photograph is taken, a latent image is formed on the negative sheet. Thereafter, when the pull tab which normally projects outside the film pack is pulled, a film unit pull end at the leading end of the web means threads into a conventional pressure apparatus such as a pair of pressure rollers and is moved outward therebetween. As soon as said tab is torn off from the web means during this process, another pull tab attached to the next film unit to be used for the next photograph is caused to be projected into the pull position. The exposed film unit which is torn off the pull tab in the same manner as described in the foregoing, threads into the pressure apparatus by being pulled at its pull end projecting from the pressure apparatus. At this moment, the negative sheet and the positive sheet are brought into contacting superposed relation to each other, and simultaneously the pod is ruptured by the pressure apparatus and the processing liquid is spread between the two sheets. When the pull end is further pulled, the negative sheet and the positive sheet are intimately pressed together with the processing liquid spread between them by said pressure apparatus. During this process, the latent image on the negative sheet is transferred to the positive sheet as a positive image. When the negative sheet is peeled from the positive sheet after a predetermined fixing time, a photographic image is obtained on the positive sheet.

Heretofore, the above-described withdrawing operation of the peel apart type instant film unit has been manually conducted. However, there exist individual differences in the way such manual operation is performed. As a consequence, due to variations in the pulling direction of the tab, for example, the entrance angles of the pull end of the film unit are not constant at the time when the pull end of the film unit threads into the pressure apparatus, or due to differences of the pulling direction of the pull end of the film unit and of the pulling speed thereof, the film units are obliged to pass through the pressure apparatus under different conditions. As a consequence, the processing liquid is spread between the negative sheet and the positive sheet unevenly, which often results in an unacceptable quality of the photographic image to be produced on the positive sheet. Furthermore, if a camera including such film units is mounted, e.g., on a microscope for photographing, owing to the uneven pulling distance and speed, various forces tend to be exerted on the mounting portion between the microscope and the camera, and a loosening is likely to result there.

OBJECTS OF THE INVENTION

It is therefore a first object of the present invention to provide a film unit withdrawing apparatus which can automatically withdraw an exposed film unit from a film pack.

Another object of the invention is to provide a film unit withdrawing apparatus, wherein the film unit to be withdrawn from the film pack is withdrawn in such a manner as to be passed through a pressure apparatus under predetermined conditions at all times.

A further object of the invention is to provide a film unit withdrawing apparatus, wherein the film unit withdrawing conditions are made constant and the quality of the photographic image is made uniform.

A still further object of the invention is to provide a film unit withdrawing apparatus which is designed such that as soon as a photograph is taken, it automatically operates to pull and tear off the tab, and to withdraw the film unit in a single sequence.

SUMMARY OF THE INVENTION

The withdrawing apparatus according to the present invention comprises tab withdrawing means adapted to hold and withdraw a pull tab and tear off said tab from a film unit after a pull end of said film unit passes through a pressure apparatus, and film unit withdrawing means adapted to cooperatively associate with said tab withdrawing means to hold the pull end of the film unit projecting from said pressure apparatus and withdraw the film unit while permitting it to pass through said pressure apparatus. In a preferred embodiment of the present invention, the pull tab withdrawing means and the film unit withdrawing means comprise roller transfer apparatus including nip rollers. This roller transfer apparatus is mounted on a moving frame which moves in the pulling or withdrawing direction of the pull tab or the film unit.

BRIEF DESCRIPTION OF THE DRAWINGS

The above and other objects and features of the present invention will become more apparent to those skilled in the art upon reading the following detailed description with reference to the accompanying drawings in which:

FIG. 7 is a chart showing the timewise movement of the invented apparatus.

DETAILED DESCRIPTION OF THE EMBODIMENT

Figure 1:
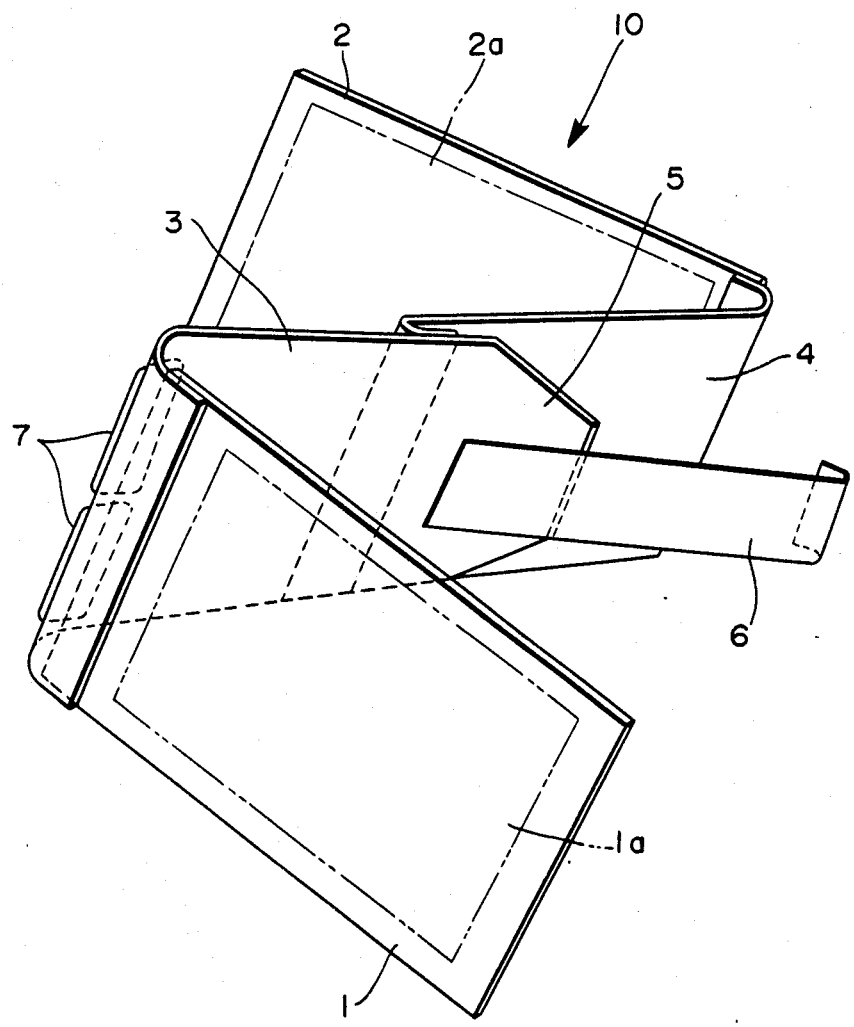
FIG. 1 is a perspective view of a peel apart type film unit to be used with the apparatus of the present invention.

As shown in FIG. 1, a peel apart type film unit 10 comprises a negative sheet 1, a positive sheet 2, a pull sheet 3 attached to the negative sheet and adapted to withdraw said negative and positive sheets 1 and 2 in superposed relation relative to each other, a transfer sheet 4 attached to the positive sheet 2 and the pull sheet 3, and a processing liquid pod 7 provided in the vicinity of said negative sheet 2 and said positive sheet 2. Also, as will be explained later, a pull tab 6 to be withdrawn prior to the withdrawal of the film unit 10 is attached at its one end to a generally end portion of said pull sheet 3 and the other end thereof is attached to a tab of the preceding film unit, which has been already withdrawn. The width of a pull end 5 of the film unit is somewhat tapered to facilitate its threading into the bite of a pair of developing rollers as will be explained later.

Figure 2:
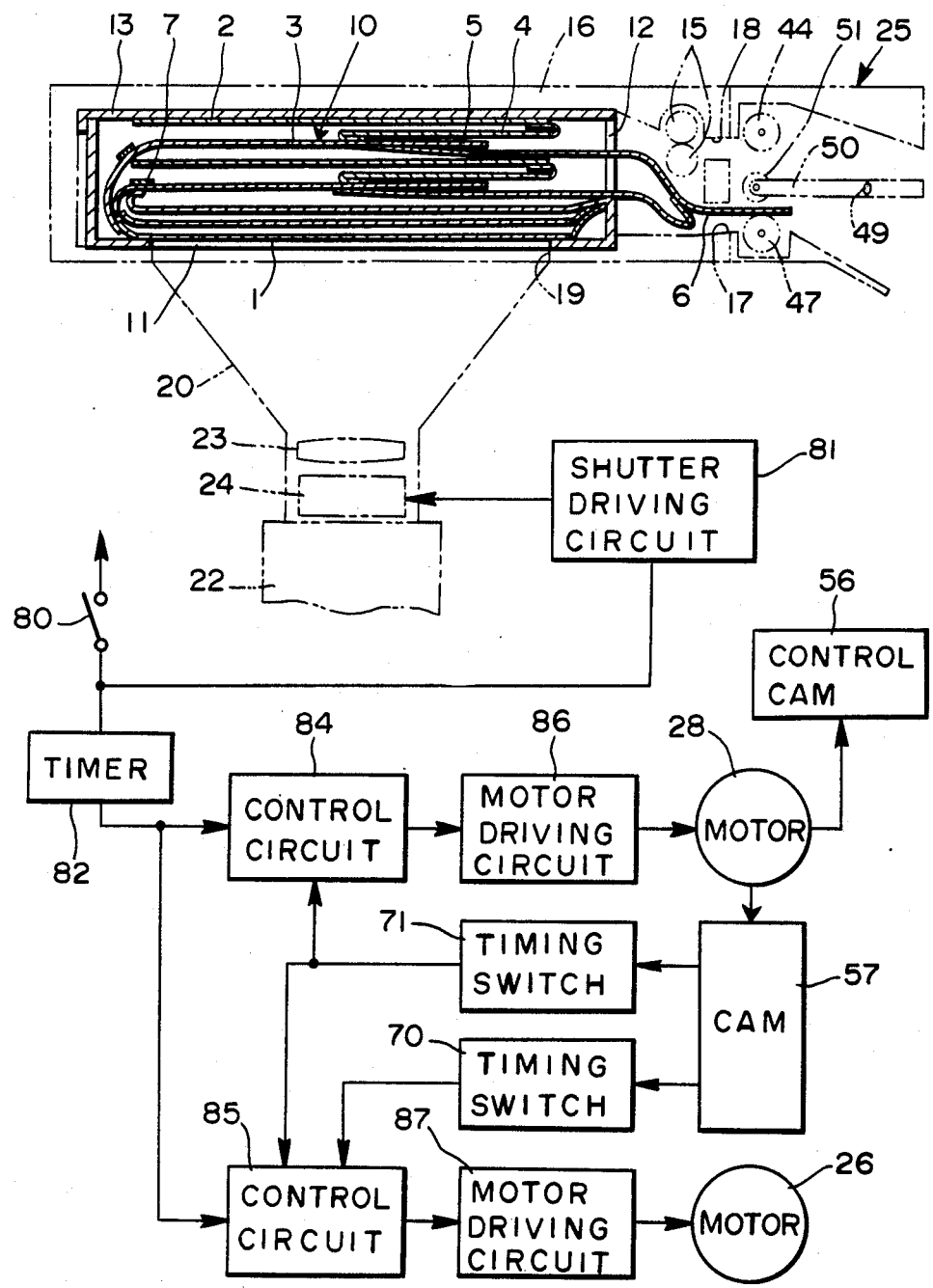
FIG. 2 is a perspective view schematically showing one embodiment of the present invention.

Said film unit 10 is contained within a film pack 13 in the form of several layers as shown in FIG. 2. On one major face of said film pack 13, an exposure aperture 11 is formed, and on an edge thereof, an opening 12 through which the film unit can be withdrawn is formed. When a photograph is taken after said film pack 13 is loaded in a camera back 16 having a pair of developing rollers 15, the photosensitive surface 1a (refer to FIG. 1) of the negative sheet 1 is exposed to light through the exposure aperture 11 and a negative image is formed thereon. Thereafter, when the tab 6 projecting through an opening 17 formed in the camera back 16 is withdrawn, the pull sheet 3 and the negative sheet 1 are moved toward said opening 12 through which the film unit is to be withdrawn. Simultaneously, since the transfer sheet 4 is caused to proceed toward said opening 12 beginning with its portion attached to the pull sheet 3, the pull sheet 3 and the transfer sheet 4 proceed in superposed relation relative to each other. The pull end 5 of the pull sheet 3 passes through the withdrawing opening 12 formed in the film pack 13 and threads between said one pair of developing rollers 15. Said one pair of developing rollers 15 are urged toward each other so that they are rotated in close relation. However, since the thickness of said pull sheet 3 is thinner than the gap between said developing rollers 15, the pull end 5 of the pull sheet 3 can easily pass through the gap between the developing rollers 15 and emerge from the opening 18 of the camera back 16.

When the tab 6 is further withdrawn and the connection between the pull sheet 3 and the tab 6 approaches the developing rollers 15, the withdrawing direction of the tab 6 becomes almost perpendicular to the pull sheet 3. As a result, the tab 6 is torn off from the pull sheet 3. At this moment, the tab of the next film unit is projected through the opening 17 of the camera back 16.

Subsequently, when the pull end 5 is drawn out farther, the pull sheet 3 and the transfer sheet 4 are caused to pass between the developing rollers 15 in superposed relation and thereafter the photosensitive surface 1a of the negative sheet 1 and the image receiving surface 2a of the positive sheet 2 are caused to proceed toward the gap between the developing rollers 15 in superposed relation. However, before they thread between the developing rollers 15, the processing liquid pod 7 is ruptured by the pressure of the developing rollers 15, and the processing liquid flows between the photosensitive surface 1a of the negative sheet and the image receiving surface 2a of the positive sheet 2. When the pull end 5 is drawn out still farther, the negative sheet 1 and the positive sheet 2 are forced together under the pressure exerted on them by the rollers 15. The photosensitive surface 1a and the image receiving surface 2a are pressed against each other intimately, and at the same time the processing liquid is evenly spread therebetween. Therefore, by the time when the negative sheet 1 and the positive sheet 2 have passed out from between the developing rollers 15, the processing liquid has reached the entire area between the photosensitive surface 1a and the image receiving surface 2aq, and the negative image produced on the photosensitive surface 1a is transferred to the image receiving surface 2a as a positive image. When the negative sheet 1 and the positive sheet 2 are peeled apart after a predetermined fixing time, a photographic image is thus produced on the image receiving surface 2a of the positive sheet 2. In this way, the processing of one unit is completed, and the subsequent photograph and its processing can be repeated in the same manner as described above.

In use, the film pack 13 containing film units 10 as described above is loaded in the camera back 16 as shown in FIG. 2. An exposure aperture 19 formed in the camera back 16 coincides with the exposure aperture 11 of the film pack 13 and the camera back 16 is mounted on a microscope 22 through an adapter 20. Said adapter 20 is provided with an image forming lens 23 and a shutter 24. In the vicinity of the tab withdrawing opening 17 and the film withdrawing opening 18 provided at the camera back 16, a film unit withdrawing apparatus 25 is positioned.

Figure 3:
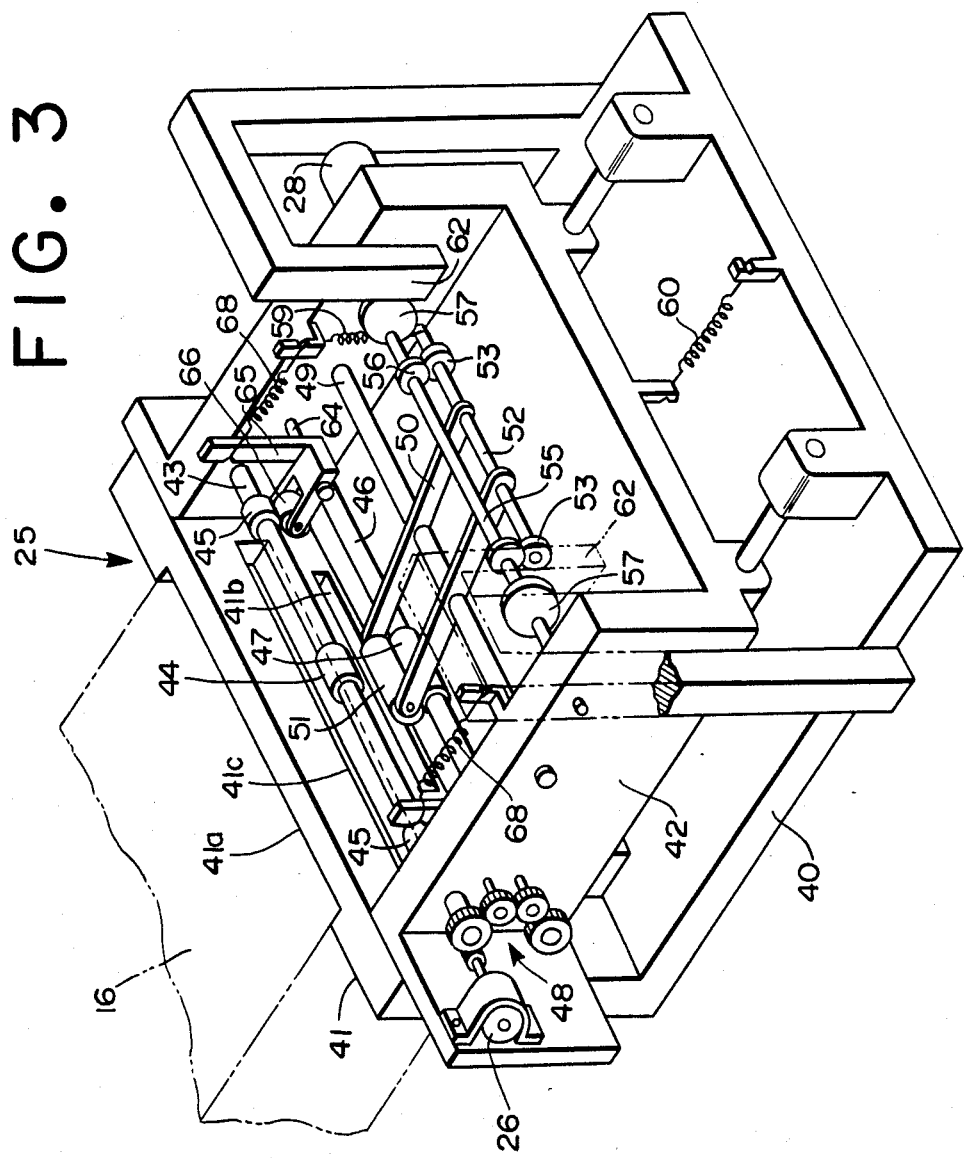
FIG. 3 is a perspective view of one embodiment of the present invention.

As shown in FIG. 3, the withdrawing apparatus 25 includes a base 40 and a moving frame 42 which is arranged to be slidable with respect to said base 40. A shaft 43 is rotatably supported by the moving frame 42. At the central portion of said shaft 43, a center roller 44 is secured, and at its both sides, side rollers 45 are secured. Furthermore, on a shaft 46 rotatably supported by the moving frame 42, a roller 47 is secured. Said shafts 43 and 46 are rotated by a motor 26 through a gear train 48, said shaft 43 being rotated in the clockwise direction and said shaft 46 being rotated in the counterclockwise direction. Reverse rotation of the shafts 43 and 46 is prevented by a one-way clutch (not shown) provided in the gear train 48. On a shaft 49 secured to the moving frame 42, an oscillating lever 50 is mounted for oscillation about the axis of shaft 49. At one end of said oscillating lever 50, a freely rotatable roller 51 is supported, while at the other end thereof, a pair of cam followers 53 are rotatably supported on a shaft 52.

Said moving frame 42 is further provided with a rotatable shaft 55. On said shaft 55, there are provided a pair of control cams 56 adapted to control the oscillation of said oscillating lever 50 through said pair of cam followers 53, and a pair of cams 57 adapted to move the moving frame 42 with respect to the base 40. Between the shaft 52 and the moving frame 42, a spring 59 is stretched in order to bias the lever 50 in the counterclockwise direction. As a consequence, the cam followers 53 are caused to abut against the cam surfaces of said control cams 56. Since said moving frame 42 is biased toward the lower right in FIG. 3 by a spring 60 stretched between the base 40 and said frame 42, the cam surface of one of said cams 57 abuts against one of corresponding cam followers 62 secured to the base 40, thus determining the stopping position of the frame 42.

An arm 65, which is rotatable with respect to the moving frame 42 on a shaft 64, is provided to support a freely rotatable roller 66, and owing to the biasing force of a spring 68 adapted to bias the arm 65 in the clockwise direction, the freely rotatable roller 66 is caused to abut against one of the side rollers 45 and is thereby driven in rotation. Such a freely rotatable roller 66 is provided at both sides, one for each side roller 45.

An upright portion 41 on the camera side of said base 40 is formed with a recess 41a adapted to receive one end portion of the camera back 16, i.e., the portion where the openings 17 and 18 are formed, an elongated slot 41b permitting the tab 6 to pass therethrough, and an elongated slot 41c permitting the pull end 5 of the film unit 10 to pass therethrough.

Figure 4:
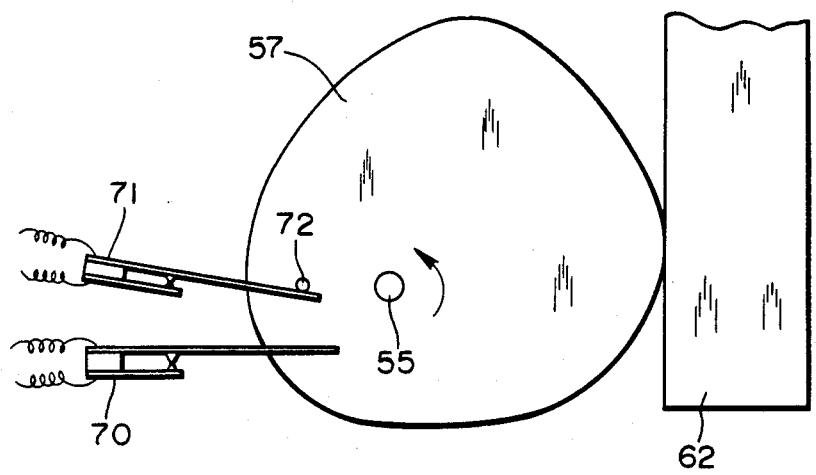
FIG. 4 is a schematic view of timing switches to be used in the present invention.

As shown in FIG. 4, a pin 72 is carried by the cam 57 in order to turn off timing switches 70 and 71 according to the rotated position of cam 57. When the cam 57 is rotated in the counterclockwise direction in FIG. 4 and the small diameter portion of the cam 57 is brought against the cam follower 62, in other words, when the moving frame 42 is moved to the right extreme in FIG. 3, the timing switch 70 is turned on. When the cam 57 is further rotated a predetermined amount immediately before the large diameter portion of the cam 57 departs from the cam follower 62 or, in other words, after the moving frame 42 is moved all the way to the upper left in FIG. 3, the timing switch 71 is turned on.

Furthermore, in FIG. 2, when a release switch 80 is turned on, the shutter 24 is actuated through a shutter driving circuit 81. When the release switch 80 is turned on, a release signal is input into respective control circuits 84 and 85 adapted to control the driving of motors 26 and 28 after a slight delay of time corresponding to the completion of the movement of the shutter 24 as determined by a timer 82. The motors 26 and 28 are designed so as to be driven through respective motor driving circuits 86 and 87. As mentioned above, the motor 28 causes to rotate the control cam 56 and the cam 57, and the cam 57 further causes the timing switches 70 and 71 to turn on after a predetermined time interval. The pulse signal obtained by turning the timing switches 70 and 71 on is inputted into the control circuits 84 and 85, respectively.

The operation of the present invention will now be described with reference to FIG. 5 through FIG. 7.

When the release switch 80 is turned on, the shutter 24 is actuated through the shutter driving circuit 81 and a first negative sheet 1 in the exposure aperture 11 is exposed. After being delayed for at least the operating time of the shutter 24 by the timer 82, the release signal is input into the control circuits 84 and 85. As a result, the control circuit 84 causes the motor 28 to be rotated through the motor driving circuit 86. When the motor 28 rotates, the shaft 55 is rotated to rotate in turn the control cams 56 and 57. As a result, the lever 50 is oscillated about the shaft 49 in the counterclockwise direction through the cam follower 53. As a consequence, the driven roller 51 supported by the oscillating lever 50 is moved from the phantom line position ("intermediate" in FIG. 7) in FIG. 5A to the solid line position ("lower" in FIG. 7) in FIG. 5A, and the tab 6 projecting from the opening 17 (see FIG. 2) of the camera back 16 is grasped between the roller 47 and the driven roller 51.

Figure 5A:
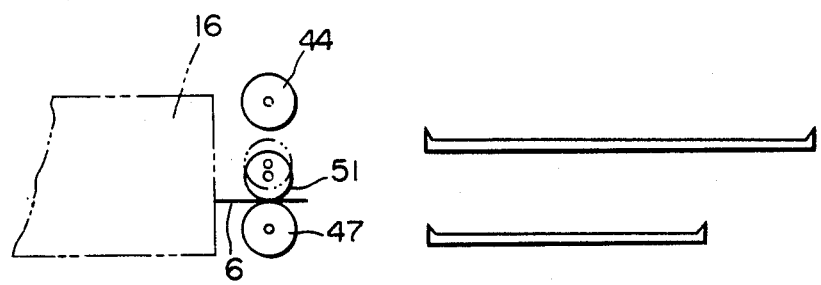
FIG. 5A through FIG. 5D are schematic views showing the withdrawing movement of a pull tab of the invented apparatus.
Figure 5B:
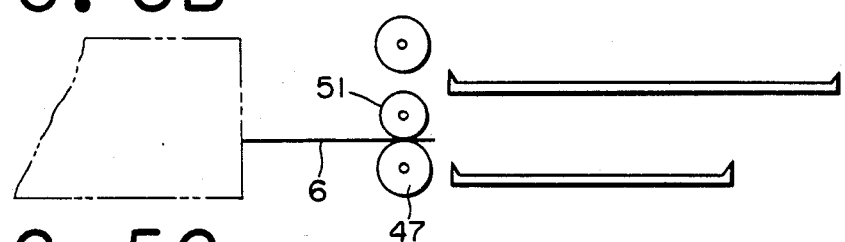

At the same time, thanks to the rotation of the cam 57, the frame 42 is moved to the right, and the tab 6 is withdrawn as shown in FIG. 5B. Since the roller 52 is prevented from rotating reversely by the one-way clutch, the tab 6 is withdrawn steadily. When the moving frame 42 has moved to the extreme right, the timing switch 70 is turned on by the pin 72 on the cam 57 to rotate the motor 26 (see FIG. 7). Since the roller 47 is rotated by the motor 26, the driven roller 51 is also rotated, thus further withdrawing the tab 6 held therebetween. Then, as shown in FIG. 5C, the tab 6 is torn off and sent to a tab recovering case 90.

Figure 5C:
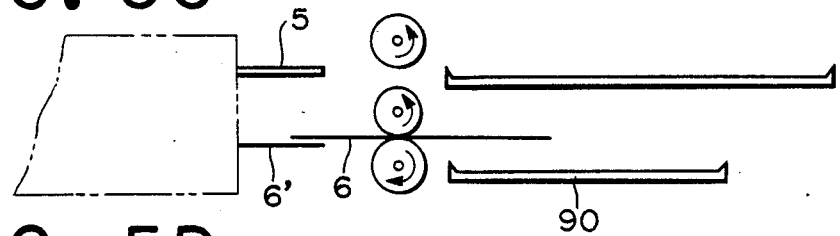
Figure 5D:
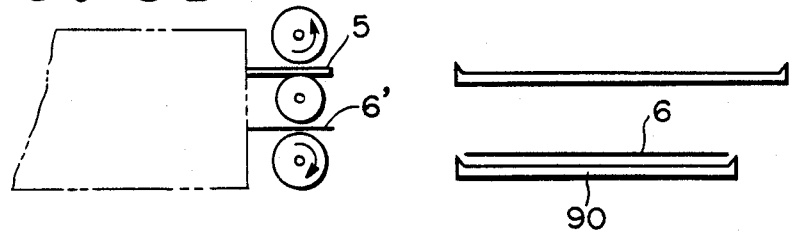

When the tab 6 has been withdrawn to some extent, the pull end 5 is withdrawn from the camera back 16, and the tab 6' of the next film unit is withdrawn (FIG. 5C). In the meantime, the control cam 56 and the cam 57 keep rotating. According to the configurations of the respective cam surfaces, the driven roller 51 is urged against the roller 47 in FIG. 5A, FIG. 5B and FIG. 5C, while the moving frame 42 is in the extreme right position in FIG. 5B and FIG. 5C.

When the tab 6 is completely torn off, the moving frame 42 is moved leftward according to the cam surface configuration of the cam 57. Simultaneously, according to the cam surface configuration of the control cam 56, the lever 50 is oscillated in the clockwise direction. As a result, the driven roller 51 returns to a position spaced from the roller 57, i.e., the "intermediate" position shown in FIG. 7 and FIG. 5D.

Figure 6A:
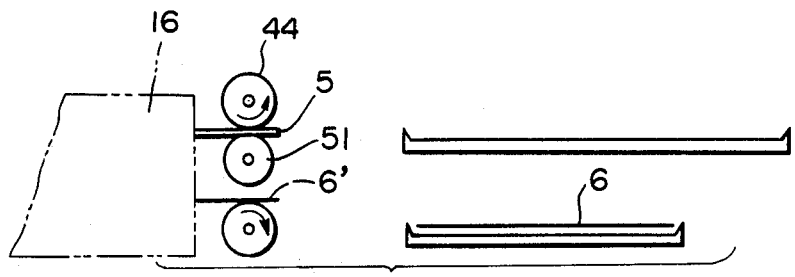
FIG. 6A through FIG. 6D are schematic views schematically showing the withdrawing movement of a film unit of the invented apparatus.

When the motor 28 is further rotated, the lever 50 is oscillated in the clockwise direction. As a result, the driven roller 52 is urged against the center roller 44 mounted on the shaft 43, i.e., the "upper" position as shown in FIG. 7 and FIG. 6A. Since the center roller 44 continues rotating, as soon as the driven roller 51 is urged against it, the pull end 5 is grasped and withdrawn as shown in FIG. 6A and FIG. 6B.

In this way, the pull end 5 begins to be withdrawn. When the pull end 5 is withdrawn to some extent and the tapered portion as shown in FIG. 1 passes through the bite of rollers 44 and 51, according to the cam surface configuration of the control cam 56, the lever 50 is slightly oscillated in the counterclockwise direction. As a result, the driven roller 52 moves away from the center roller 44 and returns to a position shown by the broken line in FIG. 6C, i.e., the "intermediate" position shown in FIG. 7. At this moment, the pull sheet 3 of the film unit and a portion of the transfer sheet 4 are disposed between the side roller 45 and the free roller 66. Since the free roller 66 is urged against the side roller 45 by the spring 68, when the side roller 45 is rotated by the motor 26, the free roller 66 follows the rotation of the side roller 45. As a result, as shown in FIG. 6D, the superposed pull sheet 3 and transfer sheet 4, and also the negative sheet 1 and the positive sheet 2 are withdrawn and sent to a sheet receiver 95. In this way, by releasing the driven roller 51, uneven pressure can be prevented from being applied to the photographic image surface of the film unit which is undergoing the developing and fixing treatment.

Figure 6B:
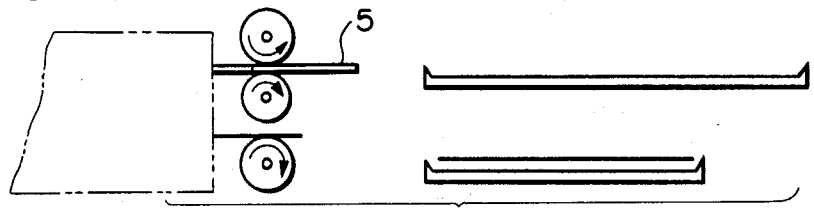
Figure 6C:
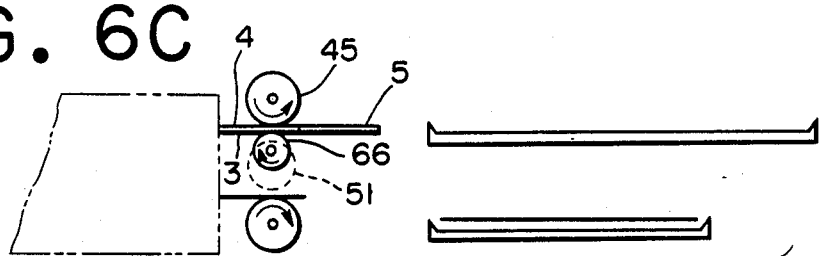
Figure 6D:
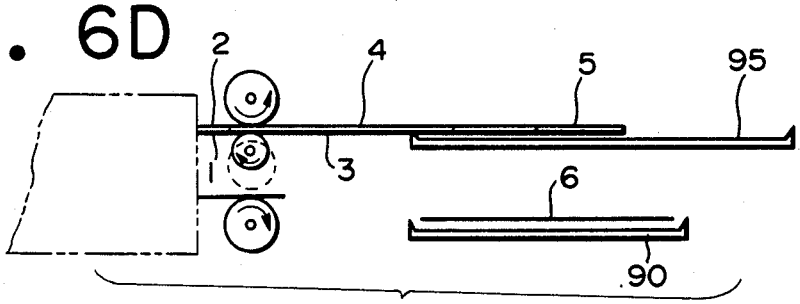

The configuration of the cam surface of the cam 57 is such that the moving frame 42 is kept in the left extreme position, as shown in FIG. 7 and in FIGS. 6B–6D, during the time when the film unit is being withdrawn as described above.

In this way, when the operation of withdrawing the film unit is completed, the pin 72 on the cam 57 turns on the timing switch 71 (see FIG. 4). The pulse signal obtained by turning on the timing switch 71 is input into the control circuits 84 and 85. As a result, a stop signal is sent to the motor driving circuits 86 and 87 for stopping the motors 26 and 28, and the apparatus thus returns resumes its initial state. This means that preparation for the next photograph has been completed.

As will be apparent from the foregoing description, during one cycle, from the start of the withdrawal of the tab 6 to the completion of the withdrawal of the film unit, the control cam 56 and the cam 57 are caused to be rotated one full turn. Since the withdrawn tab 6 is discharged passing under the lever 50 and the film unit 10 is recovered passing over the lever 50, they can be separately recovered by providing respective auxiliary passageways (not shown). Also, when a film unit as described is to be used for the first time, it is necessary to withdraw a safety sheet provided on the top layer for excluding light. This light excluding sheet is usually formed longer than the length of the tab 6, but it can be withdrawn in the same manner as described with respect to the pull tab. For this purpose, for example, the release switch 80 can be operated twice for discharging the light excluding sheet.

In an alternative arrangement, the moving frame 42 may be biased leftward and the cam follower 62 may abut against the cam 57 from the left. Also, instead of providing the pin 72 on the cam 57 for turning on the timing switches 70 and 71, another switching member may be provided on the shaft 55. According to still another alternative, the motor 26 may be rotated by using a microswitch which is turned on when the moving frame 42 moves to the extreme right, and the motors 26 and 28 may be stopped by the input of a timer circuit which is actuated by said microswitch.

What is claimed is:

1. A film unit withdrawing apparatus in which film units contained in a film pack and having tabs are withdrawn and passed through pressure apparatus, comprising:

withdrawing means for tabs connected to said film units and adapted to hold and withdraw a said tab projecting outside of said film pack, said tab withdrawing means withdrawing a pull end of one of said film units to which a said tab is attached, from said film pack in order to pass said pull end through said pressure apparatus by withdrawing said tab and thereafter tearing off the tab from said film unit;

film unit withdrawing means adapted to hold and withdraw a pull end of said film unit after passing it through said pressure apparatus, said film unit withdrawing means withdrawing said film unit from said film pack while passing it through said pressure apparatus; and means operatively connecting said tab withdrawing means with said film unit withdrawing means, said connecting means actuating said film unit withdrawing means at a time when the tab is torn off from the film unit by said tab withdrawing means.

2. A film unit withdrawing apparatus according to claim 1, wherein said tab withdrawing means comprises a first roller adapted to contact the tab on one side of the tab and a driven roller urged toward the first roller on the other side of the tab to hold the tab therebetween, and said film unit withdrawing means including a second roller adapted to contact said pull end on one side of said pull end and said driven roller urged toward the second roller on the other side of said pull end to hold said pull end therebetween.

3. A film unit withdrawing apparatus according to claim 2, wherein said first roller and said second roller are rotated by motor means, and said driven roller is rotated following the rotation of either said first or second roller.

4. A film unit withdrawing apparatus according to claim 3, wherein said second roller includes a roller portion adapted to transfer the film unit by drivingly contacting marginal portions at both sides of the film unit.

5. A film unit withdrawing apparatus according to claim 4, wherein said associating mechanism comprises an oscillating lever rotatably carrying said driven roller, a first cam adapted to oscillate said oscillating lever such that said driven roller may follow the motion of either said first or second roller, and a motor adapted to rotate said first cam.

6. A film unit withdrawing apparatus according to claim 5, wherein said first and second rollers, and said oscillating lever carrying said driven roller are mounted on a moving frame, said moving frame being movable along the withdrawing direction of said tab or said film unit.

7. A film unit withdrawing apparatus according to claim 6, wherein said moving frame is moved by a second cam coaxial with said first cam, said moving frame being moved to withdraw the tab from the film unit at the time when the tab is held between said first roller and said driven roller and thereafter the tab being torn off from said film unit by means of the driving of said first roller.

8. A film unit withdrawing apparatus according to claim 7, wherein said moving frame is stopped in a position close to said film pack at a time when said film unit withdrawing drawing means withdraw said film unit.

9. A film unit withdrawing apparatus according to claim 8, wherein said pressure apparatus in a pair of rollers.

* * * * *